US005967036A

United States Patent [19]

Marmin et al.

[11] Patent Number: 5,967,036

[45] Date of Patent: Oct. 19, 1999

[54] WEB INFEED DEVICE FOR ROTARY PRINTING PRESSES

[75] Inventors: Jean Claude Marmin, Estrees St. Denis; Franck Adamik, Cinqueux, both of France

[73] Assignee: Heidelberger Druckmaschinen AG, Heidelberg, Germany

[21] Appl. No.: 09/057,827

[22] Filed: Apr. 9, 1998

[30] Foreign Application Priority Data

Apr. 10, 1997 [FR] France .................................. 97 04395

[51] Int. Cl.$^{6}$ ................................ B41F 5/04; G03B 1/56

[52] U.S. Cl. .......................... 101/219; 101/417; 101/228; 226/92

[58] Field of Search .................................... 101/219, 228, 101/417; 226/92

[56] References Cited

U.S. PATENT DOCUMENTS

| | | | |
|---|---|---|---|
| 2,052,621 | 9/1936 | Gurwick | 101/417 |
| 2,336,754 | 12/1943 | Schelhammer et al. | 101/417 |
| 2,862,705 | 12/1958 | Faeber | 226/92 |
| 3,127,079 | 3/1964 | Allander | 226/92 |
| 3,995,553 | 12/1976 | Winterholler et al. | 101/228 |
| 4,111,122 | 9/1978 | Kutzner et al. | 226/92 |
| 4,706,862 | 11/1987 | Thielacher | 226/92 |
| 4,924,776 | 5/1990 | Cunningham et al. | 226/92 |
| 4,987,830 | 1/1991 | Fukuda et al. | 226/92 |
| 5,320,042 | 6/1994 | Schwöfinger | 101/417 |
| 5,400,940 | 3/1995 | Sato et al. . | |

FOREIGN PATENT DOCUMENTS

| | | |
|---|---|---|
| 0 302 256 | 2/1989 | European Pat. Off. . |

*Primary Examiner*—Eugene Eickholt
*Attorney, Agent, or Firm*—Herbert L. Lerner; Laurence A. Greenberg

[57] ABSTRACT

A web infeed device for rotary printing presses, including a flexible, finite infeed element having a length greater than a spacing between adjacent drive elements for the infeed element includes a guide wherein the flexible infeed element is received, a plurality of rotationally symmetrical bodies inserted into the flexible infeed element for guiding the flexible infeed element and for reducing friction thereof within the guide, the flexible infeed element having a coating for reducing friction with the guide.

16 Claims, 9 Drawing Sheets

WEB INFEED DEVICE FOR ROTARY PRINTING PRESSES

BACKGROUND OF THE INVENTION

Field of the Invention

The invention relates to a web infeed device for rotary printing presses and, more particularly, to such a device for guiding one or more webs through all the components of the rotary printing press.

U.S. Pat. No. 4,987,830 discloses a web infeed device for rotary printing presses. In this device, many guide rails are mutually aligned in rows along the various web paths. A linear element guidable along a previously defined web path is disposed in the guide rails. A lever is mounted on the linear element and, on a side thereof facing towards the web, is provided with a snap closure, from which a new web which is to be inwardly threaded can be suspended and thereby pulled through the press. The linear element is moved by a plurality of drive stations disposed along the guide rails. The length of the linear element is selected so that it just exceeds the spaced distance between any two adjacent drive stations.

The published Japanese patent document JP Hei 2-265 848 relates to a device for infeeding paper for a rotary printing press. In this construction, the web to be infed is guided from a paper-roll support through the printing units of the press to a folding apparatus. Along the web path defined by the components of the press, a guide path is provided. An infeed or insertion element for inserting the paper web has a strip or band-shaped construction and is provided with regularly arranged openings or bumps on at least one side thereof. The openings may also extend all the way through the strip or band-shaped infeed element. A take-up or receiving section for the starting end of the material to be fastened and in-threaded is also provided on the strip or band-shaped infeed or insertion element. A drive system made up of a plurality of drive stations engages in the openings or with the bumps on the strip or band-shaped infeed or insertion element in order to guide the infeed or insertion element by rotation.

Moreover, a device for infeeding or inserting webs of material in rotary printing presses has previously become known from German Patent 2 402 768. In this embodiment, a flexible, finite infeed or insertion element is provided having a length which is somewhat greater than the spacing between adjacent drive elements, a plurality of which are provided for moving the infeed or insertion element in guides and shunts along an infeed or insertion path. Along the infeed or insertion path, scanners or sensors are provided for turning on whichever drive element is needed and simultaneously turning off whichever drive element is no longer needed, the scanners or sensors being actuatable by the infeed or insertion element.

SUMMARY OF THE INVENTION

It is an object of the invention to provide a web infeed device for rotary printing presses wherein movement of the web with the least possible friction in all infeed or insertion paths is assured, and wherein the infeeding or insertion of the web is performable by the printing press components without manual intervention.

With the foregoing and other objects in view, there is provided, in accordance with the invention, a web infeed device for rotary printing presses, including a flexible, finite infeed element having a length greater than a spacing between adjacent drive elements for the infeed element, comprising a guide wherein the flexible infeed element is received, a plurality of rotationally symmetrical bodies inserted into the flexible infeed element for guiding the flexible infeed element and for reducing friction thereof within the guide, the flexible infeed element having a coating for reducing friction with the guide.

In accordance with another feature of the invention, the rotationally symmetrical bodies are formed as balls.

In accordance with an alternative feature of the invention, the rotationally symmetrical bodies are formed as pins.

In accordance with a further feature of the invention, the flexible infeed element is formed with openings for receiving the rotationally symmetrical bodies therein.

In accordance with an added feature of the invention, the openings are lined with a friction-reducing material.

In accordance with an additional feature of the invention, defining walls of the openings are coated with polytetrafluoroethylene.

In accordance with an alternative feature of the invention, sockets formed of polytetrafluoroethylene are received in the openings.

In accordance with another alternative feature of the invention, cages formed of plastic material are embedded in the openings.

In accordance with yet another feature of the invention, ball cages are embedded in the openings.

In accordance with yet a further feature of the invention, the guide is formed with contact surfaces having a friction-reducing coating engageable with the rotationally symmetrical bodies.

In accordance with yet an added feature of the invention, the infeed element is of composite construction.

In accordance with yet an additional feature of the invention, the infeed element is formed of at least one tension-proof layer covered by further layers.

In accordance with still another feature of the invention, the web infeed device includes a chain engageable with the infeed element from below for guiding the infeed element through a drying unit.

In accordance with still a further feature of the invention, the web infeed device includes a chain having chain links engageable with the rotationally symmetrical bodies from below for guiding the infeed element in a form-locking manner through a dryer. In this regard, it is noted that a form-locking connection is one which connects two elements together due to the shape of the elements themselves, as opposed to a force-locking connection, which locks the elements together by force external to the elements.

In accordance with still an added feature of the invention, the web infeed device includes drive elements for the infeed element, the drive elements being formed as cylinders having an outer cylindrical surface formed with a plurality of recesses for engaging the rotationally symmetrical bodies from above.

In accordance with a concomitant feature of the invention, the web infeed device includes drive elements for advancing the infeed element, each of the drive elements including two friction rollers for receiving therebetween the infeed element provided with the rotationally symmetrical bodies, the friction rollers being formed with a recess therebetween for permitting passage of the rotationally symmetrical bodies therethrough as the infeed element is advanced through the friction rollers.

The advantages attained with the invention are manifold. Due to the extremely low-friction infeed or insertion element, the latter travels easily through the guide along the infeed or insertion path for the applicable web of material. The guidance of the infeed or insertion element through a dryer having a temperature up to 300° C. is also possible, without impairing the guidance of the starting end of the web by the rotation. The embodiment according to the invention furthermore enables easier passage along shunts, in order to follow other previously determined web paths.

In a further feature of the fundamental concept of the invention, rotationally symmetrical bodies, which may be balls or pins or the like, may be embedded in the flexible infeed or insertion element. For disposing the rotationally symmetrical bodies on the infeed or insertion element, openings are formed in the infeed or insertion element for receiving the rotationally symmetrical bodies. The openings formed in the infeed or insertion elements are lined with friction-reducing materials for enabling movement of the rotationally symmetrical bodies in the openings of the infeed or insertion element with the least possible friction. To that end, the openings may be provided with a polytetrafluoroethylene or Teflon coating or lining. Moreover, plastic cages or ball cages can be embedded in the openings; the rotationally symmetrical bodies then run in these cages and are retained thereby in the infeed or insertion element.

To make the movement of the infeed or insertion element in the guides easier, the contact surfaces of the guide which engage the rotationally symmetrical bodies are provided with a friction-reducing coating.

The infeed or insertion element may also be embodied as a member having a composite construction, i.e., a multilayer construction. A low-friction layer such as of polytetrafluoroethylene or Teflon may be applied over both sides of one or more layers having a requisite strength.

To assure that a web of material which is to be threaded in will also be automatically guided through the dryer of a rotation, the infeed or insertion element is engaged from below in the region of the dryer by a chain having chain links which are guided under the individual rotationally symmetrical bodies, so as to guide the infeed or insertion element lying on the chain links through the dryer.

Other features which are considered as characteristic for the invention are set forth in the appended claims.

Although the invention is illustrated and described herein as embodied in a web infeed device for rotary printing presses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
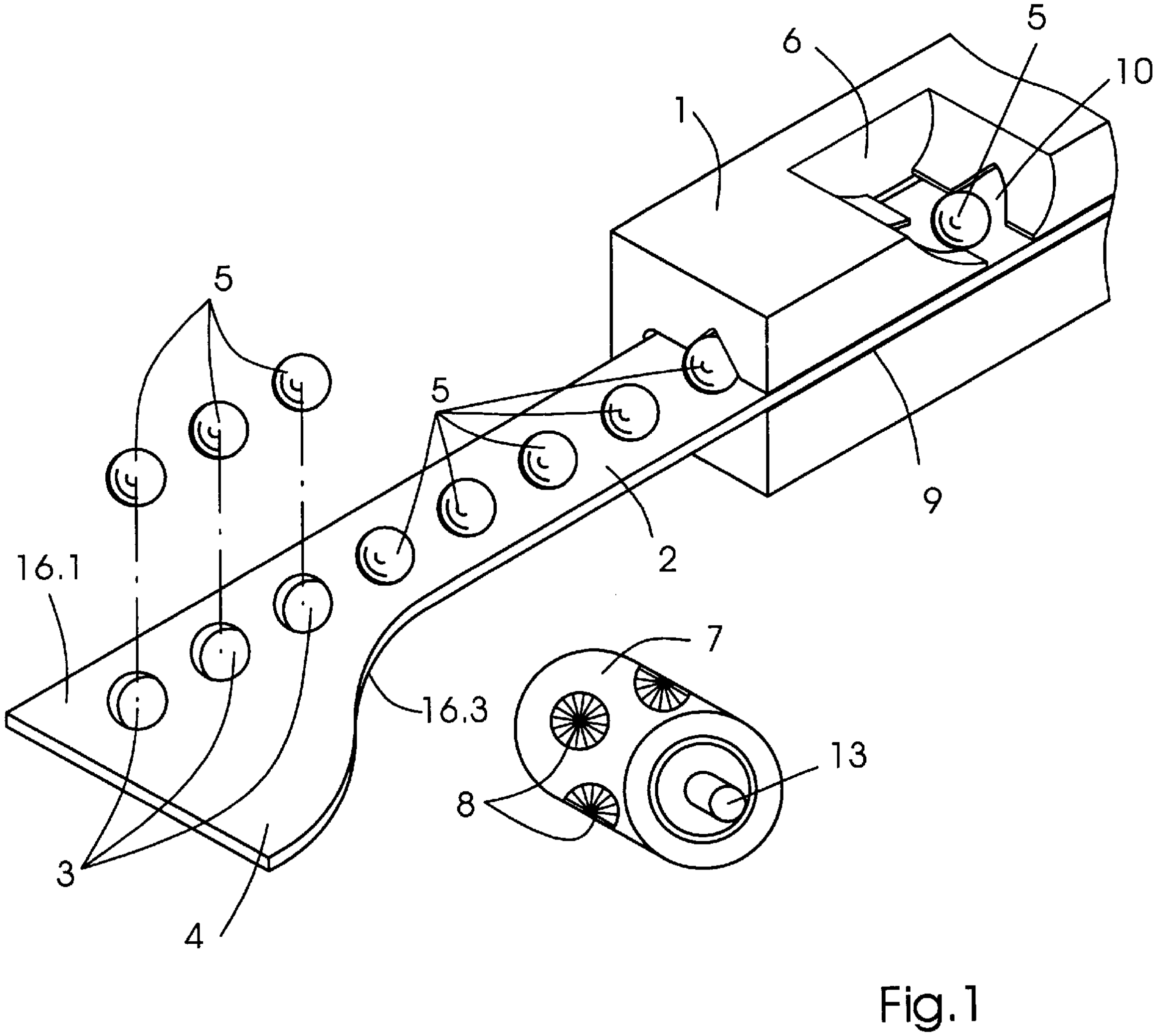
FIG. 1 is a fragmentary top, front and side perspective view of a guide partly surrounding a forward region of a web infeed or insertion element constructed in accordance with the invention.
Figure 2:
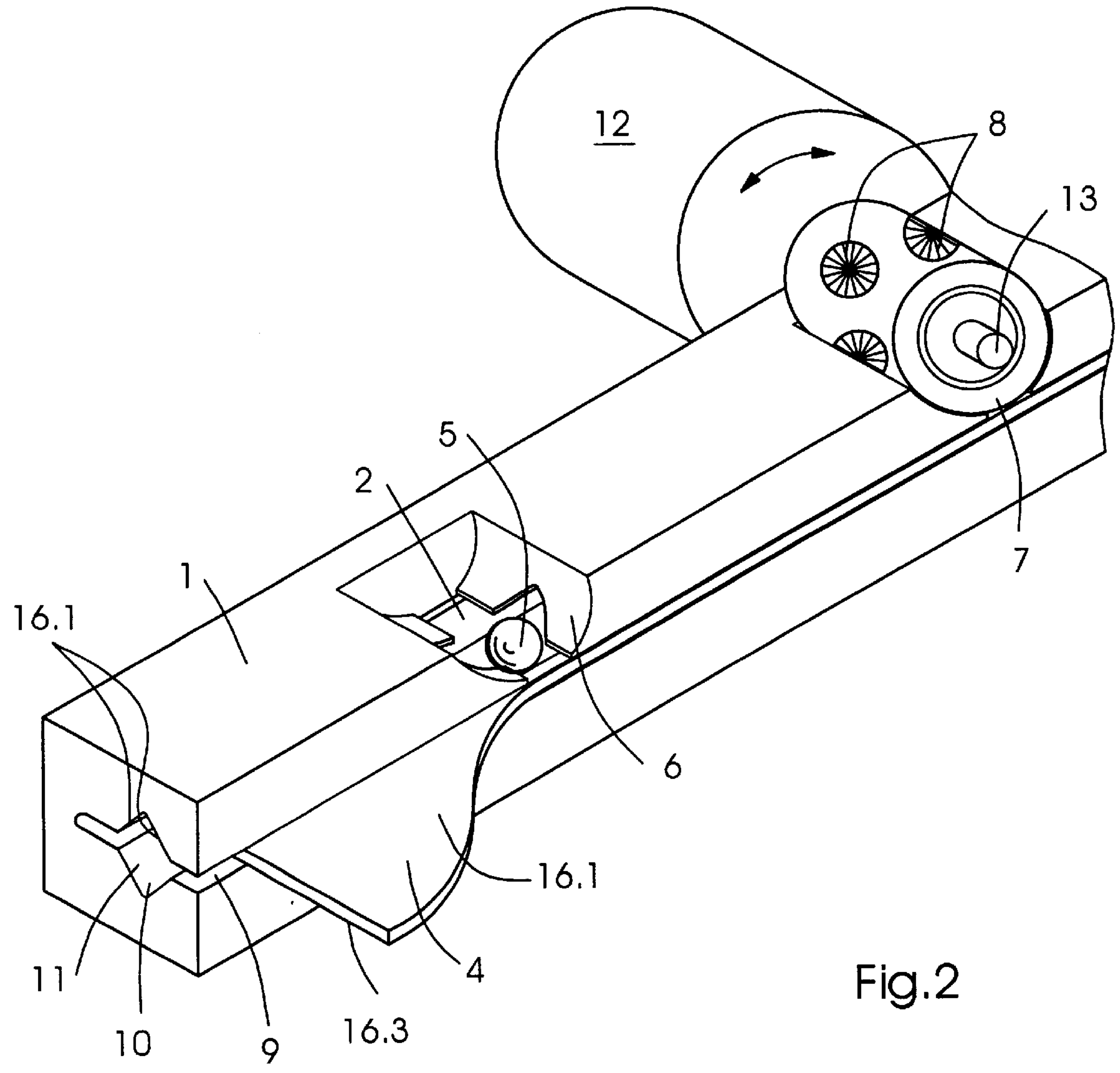
FIG. 2 is a view like that of FIG. 1, showing a larger fragment of the guide and a drive station for the infeed or insertion element.

Referring now to the drawing and, first, particularly to FIGS. 1 and 2 thereof, there is shown therein a front region of an infeed or insertion element 2 partly enclosed by a guide 1.

The guide 1 is a profile member formed of aluminum or temperature-resistant plastic material and, as much as possible, encloses or surrounds a striplike infeed or insertion element 2 formed with openings 3. The openings 3 are spaced regularly apart and serve to receive therein individual rotationally symmetrical bodies, in this case balls, for example. Besides balls, it is also conceivable to use pins or the like which are insertable into the openings 3 of the infeed or insertion element 2. The infeed or insertion element 2 is provided, at a forward or front end region 4 thereof, with a widened portion, to which a beginning or starting end of a web of material which is to be in-threaded or infed can be fastened conventionally; the specific manner in which the web is secured will not be discussed herein in any greater detail.

The guide 1 is formed both with a cross cut 10 through which rotationally symmetrical bodies 5 can pass and with a slit-shaped, longitudinally extending opening 9, wherein the infeed or insertion element 2 is essentially received. At regular intervals along the guide 1, engagement openings 6 are formed wherein respective drive elements 7 engage, the drive elements 7 being taken up or drivable by respective drive mechanisms 12 shown in FIG. 2 at respective drive stations. In FIG. 1, the drive elements 7 are shown constructed as cylindrical bodies having a circumferential surface formed with a plurality of recesses 8, the defining surfaces of the recesses 8 engaging over the rotationally symmetrical bodies 5 of the infeed or insertion element 2 and, when the bodies 5 are rotated, causing the infeed or insertion element 2 to advance. The drive mechanisms 12 for the drive elements 7 at the drive stations may be electric motors, pneumatic drives, or hydraulic drives or the like; they are disposed along the infeed or insertion path, and assure a uniform advancement of the infeed or insertion element 2 due to the rotation of the drive elements 7 and the consequent rotation of the rotationally symmetrical bodies 5.

To improve the sliding properties of the infeed or insertion element 2, the latter may be provided at the upper and underside thereof with a coating 11 formed of a polytetrafluoroethylene or Teflon layer 16.1 and 16.3, respectively. The driving power required at the drive mechanisms 12 can consequently be reduced, and the infeed or insertion element 2 can be advanced more uniformly.

The drive mechanisms 12, which can each be driven forwards and in reverse, act via a shaft 13 on drive elements 7, the surfaces defining the recesses 8 of which engaging with the rotationally symmetrical bodies 5 from above.

Figure 3:
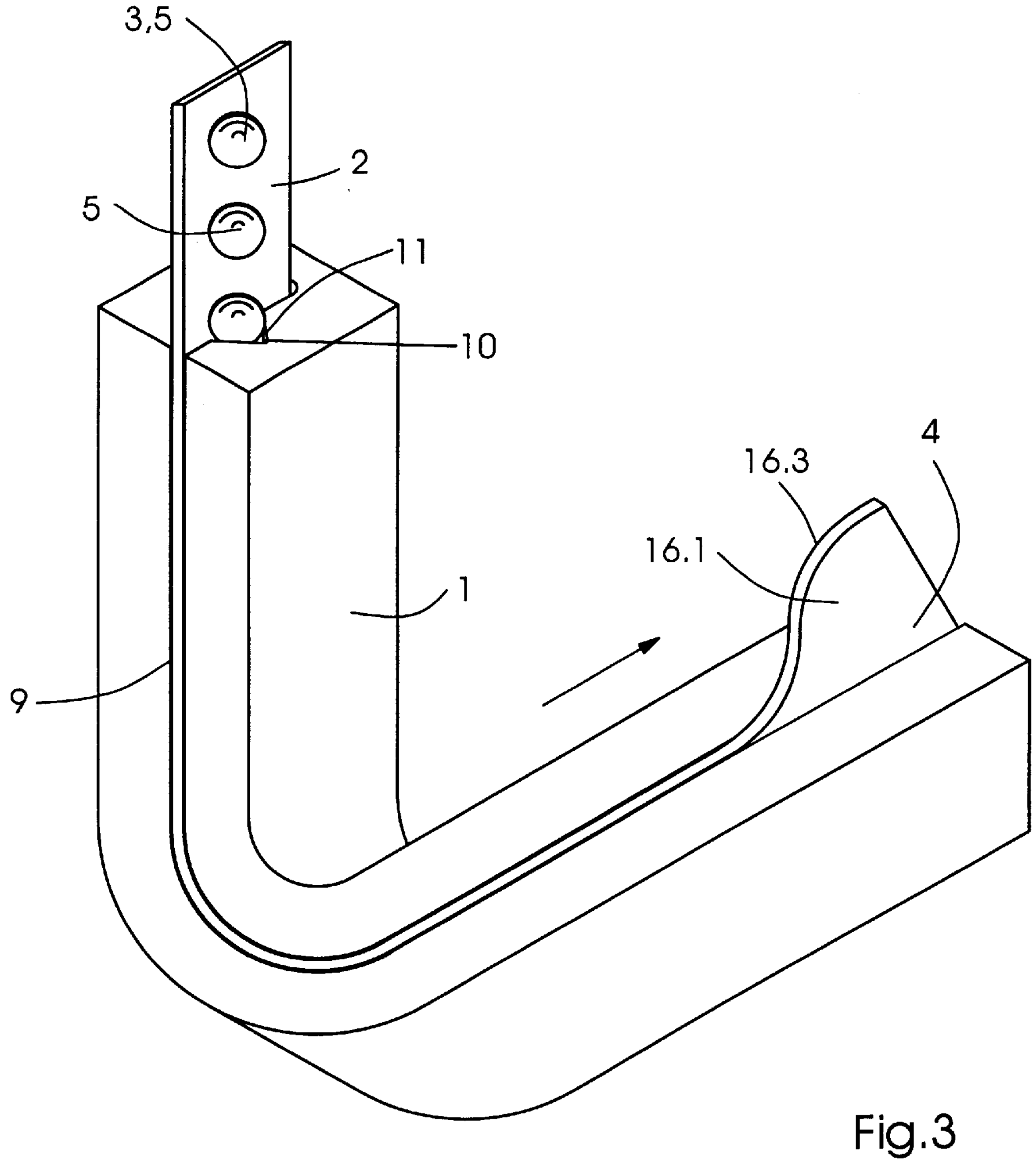
FIG. 3 is a fragmentary perspective view of the guide which is formed with a deflection therein.

FIG. 3 shows a guide 1 formed with a deflection therein. Due to the spacing of the rotationally symmetrical bodies 5 in the infeed or insertion element 2, the latter is capable of moving through even extreme deflection angles of the type shown in FIG. 3, without binding in the guide 1; due to the flexibility of the infeed or insertion element 2, it is adaptable to even the sharpest curvature, in order to guide the starting end of a web of material, received at the widened portion 4 thereof, through the press or, in other words, through the angle bar superstructure, wherein great deflections of the web can occur.

Several different embodiments of the rotationally symmetrical bodies in the infeed or insertion element are shown in FIGS. 4A to 4E.

Figure 4A:
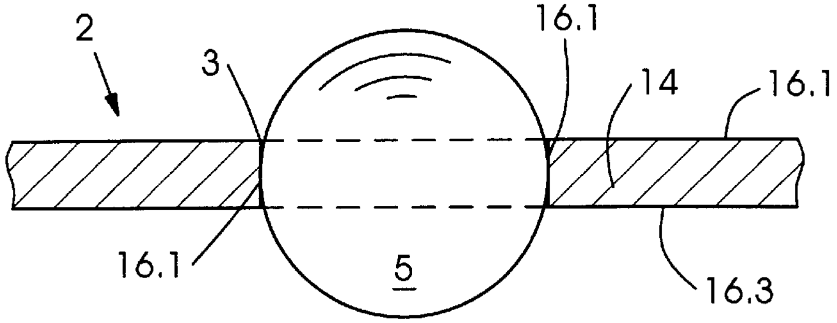
FIGS. 4A to 4E are fragmentary side elevational views of different embodiments of rotationally symmetrical bodies disposed in the infeed or insertion element according to the invention.
Figure 4B:
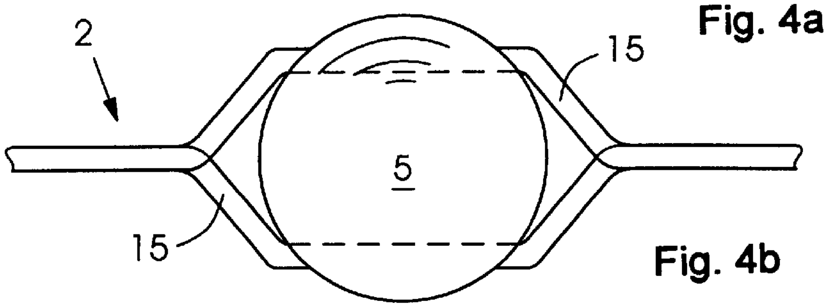
Figure 4C:
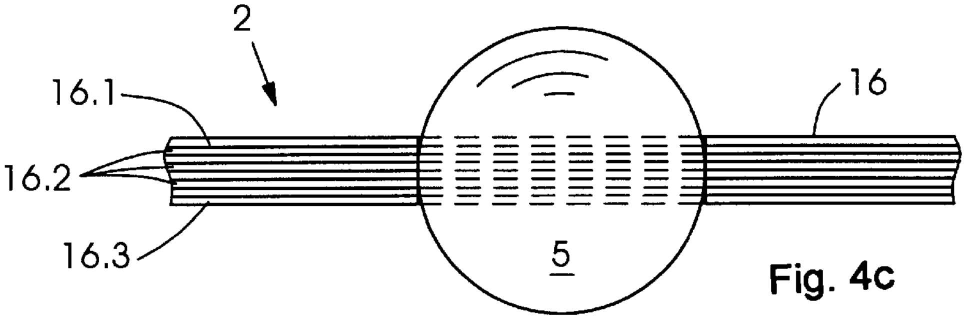
Figure 4D:
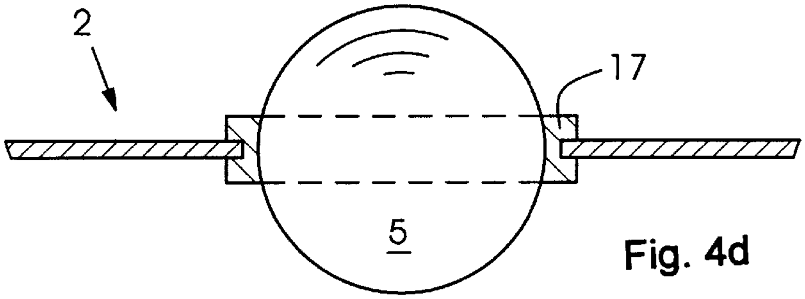
Figure 4E:
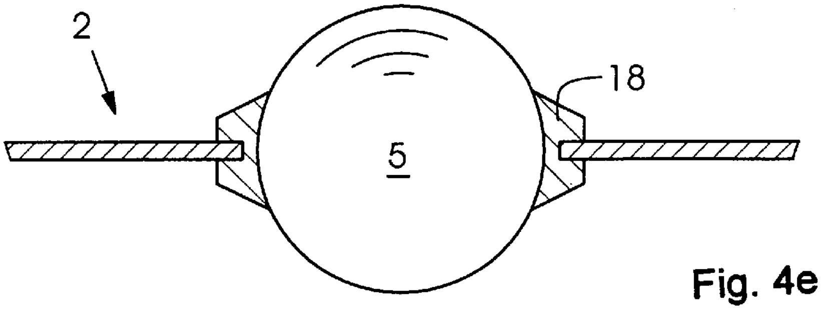

As shown in FIG. 4A, the infeed or insertion element 2 may be formed of plastic material 14, for example, with balls 5 inserted into the openings 3 provided therein. Both the upper and the underside of the infeed or insertion element 2 are provided with a friction-reducing coating 16.1 and 16.3, respectively, and the wall defining the openings 3 can be similarly coated. Alternatively, as shown in FIG. 4B, the rotationally symmetrical bodies 5 may also be fixed in ball cages 15. If, as in the embodiment of FIG. 4C, the infeed or insertion element 2 has a multilayered composite construction, the rotationally symmetrical bodies 5 are likewise inserted into the openings 3 formed in the infeed or insertion element 2. Friction-reducing polytetrafluoroethylene or Teflon coatings 16.1 and 16.3 are applied to both sides of one or more layers 16.2 which have a great tensile strength. Depending upon the construction of the composite element 16, the number of layers 16.2 provided therein can vary. As shown in FIG. 4D, the rotationally symmetrical bodies 5 may also be embraced or surrounded by polytetrafluoroethylene or Teflon sockets 17 provided in the infeed or insertion element 2. These sockets 16 substantially enclosing the respective rotationally symmetrical bodies 5 formed as balls permit low-friction movement of the balls 5, and yet the balls 5 remain centered in the respective openings 3 formed in the infeed or insertion element 2. It is also apparent from FIG. 4E that plastic cages 18 are also conceivably insertable into the openings 3 for low-friction guidance of the rotationally symmetrical bodies 5. In the different embodiments of the infeed or insertion element 2 provided with the polytetrafluoroethylene or Teflon sockets 17 (FIG. 4D) and the plastic cages 18 (FIG. 4E), the infeed or insertion element 2 can also be provided with low-friction coatings 16.1 and 16.3, respectively.

Figure 5:
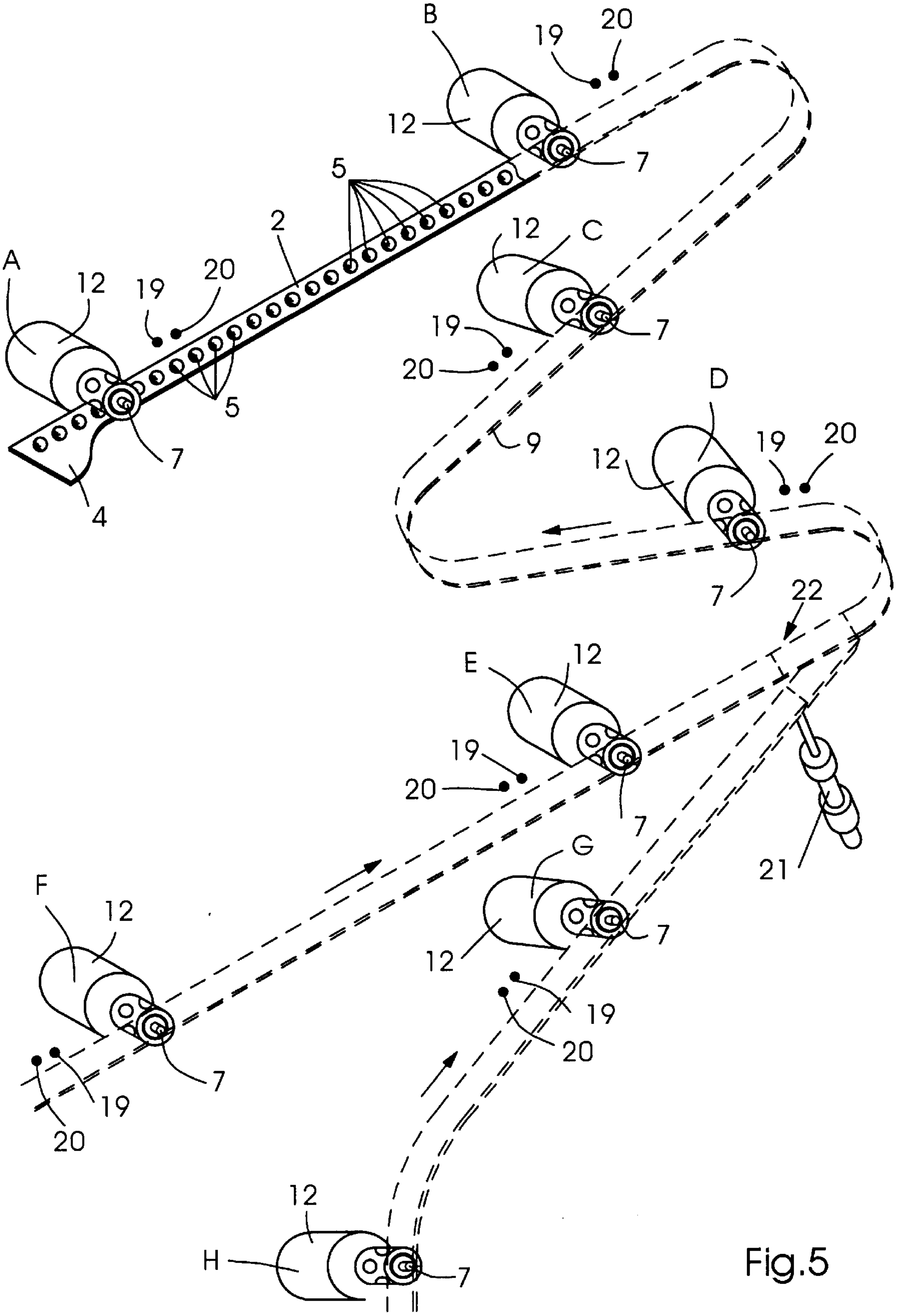
FIG. 5 is a fragmentary view, partly broken away and partly diagrammatic, of an infeed or insertion element disposed along an exemplary web infeed or insertion path.

FIG. 5 illustrates an exemplary web guidance path along which an infeed or insertion element 2 embodied as in FIGS. 1 to 3 and 4A to 4E is guided by the rotation of the drive mechanisms 12, the drive elements 7 and the rotationally symmetrical bodies 5. Arranged along the web path shown in FIG. 5 are a plurality of drive stations A to H, respectively, including a drive mechanism 12 which drives a drive element 7. Each of the drive stations A to H has a sensor or switch pair 19, 20 assigned thereto, by which, when tripped or triggered by the infeed or insertion element 2 per se, the applicable drive station is turned on and the preceding one of the drive stations A to H along the web path is turned off again. The spaced distance between adjacent drive stations, such as A and B, for example, is selected to be somewhat less than the length of the infeed or insertion element 2. As is apparent from the web path represented in FIG. 5, web paths can merge with one another at a shunt 22. The shunt 22 itself is moved by a piston/cylinder unit 21 or the like. Because of the low-friction design thereof pertaining both to the bearing of the rotationally symmetrical bodies 5 and the guide cross cut 10 thereof, the infeed or insertion element 2 can execute sharp deflections, as shown in FIG. 3, without binding in or scraping against the inside of the guide 1, which would otherwise stop the infeeding or insertion of the web of material into the rotation.

For advancing the infeed or insertion element 2 due to the rotation along the guide 1, it should also be mentioned that the spacing of the recesses 8 on the circumferential surfaces of the drive elements 7 coincides with the spacing of the rotationally symmetrical bodies 5 received on the insertion element 2.

In a non-illustrated embodiment of the invention for guiding a web of material, it is also possible, however, to drive the various drive stations A, B, C, D, E, F, G and H simultaneously and in a continuous manner. In such a case, the represented switch arrangements may be omitted.

Figure 6:
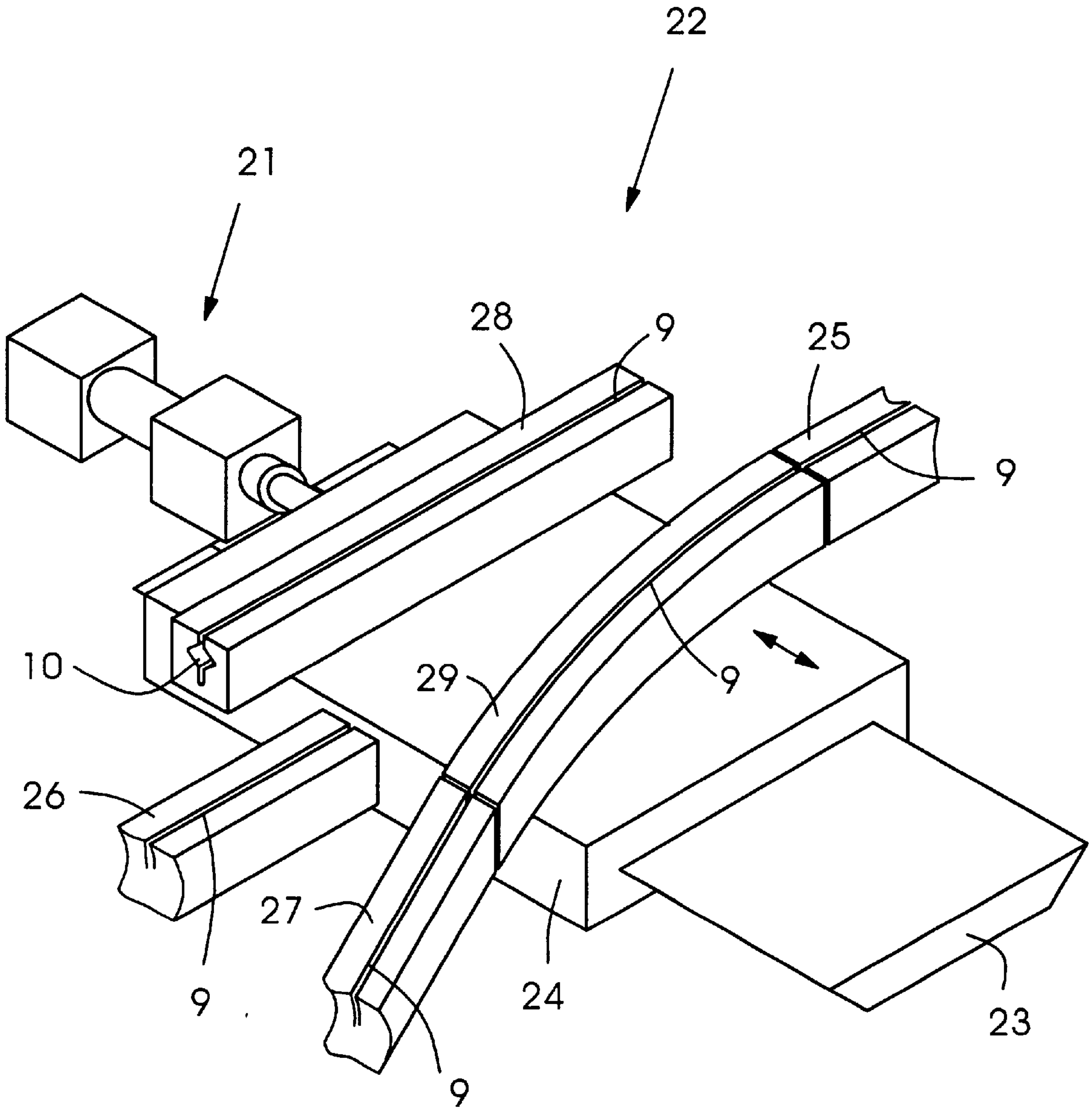
FIG. 6 is a perspective view of a shunt for maintaining the infeed or insertion element in a curvilinear direction, for example, in the infeed or insertion path, and for alternatively shifting the infeed or insertion element into a rectilinear direction, for example, of the infeed or insertion path.
Figure 7:
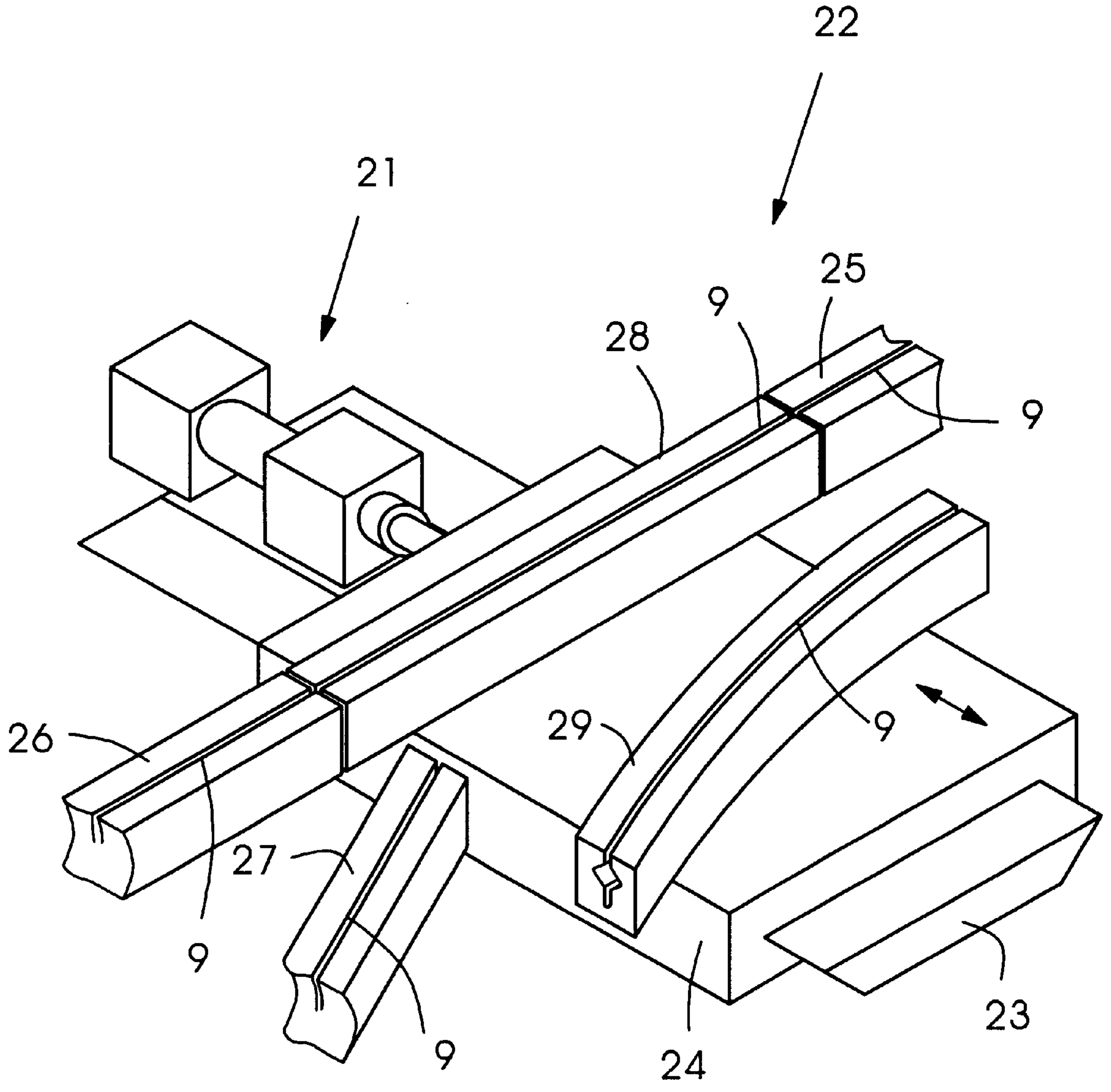
FIG. 7 is a perspective view of a shunt for maintaining the infeed or insertion element in a rectilinear direction, for example, in the infeed or insertion path, and for alternatively shifting the infeed or insertion element into a direction of the infeed or insertion path which is deflected, for example, from the rectilinear direction.

FIGS. 6 and 7 show a shunt 22 inserted into the web infeed or insertion path of FIG. 5 in various adjustment positions thereof. The shunt 22 itself has its own conventional adjusting drive 21, which need not be described in any further detail hereinafter. A base plate 24 displaceable by the adjusting drive 21 is provided on a sliding block guide 23. Both a rectilinear through element 28 of the guide 1 and a curvilinear deflection element 29 of the guide 1 are secured to the displaceable base plate 24.

In the adjustment condition of the shunt 22 shown in FIG. 6, an infeed or insertion element 2 oncoming at the end of the guide path 25 runs into the deflection element 29 or, in other words, into the slot 9 thereof provided with the guide cross cut 10, and is then fed into the further guide path 27 by the rotation. This is accomplished by the drive stations A to H shown mutually spaced apart in FIG. 5. In the condition of the shunt 22 shown in FIG. 6, the rectilinear through element 28 remains inactive; the continuation 26 of the guide path 25 is cut off from the incoming path of the infeed or insertion element 2.

FIG. 7 shows the other adjusting position of the shunt 22, wherein the base plate 24 has been displaced by the adjusting drive 21 in such a way that the infeed or insertion element 2 is carried continuously through from the guide path 25 into the continuation 26 of the guide path 25, via the rectilinear through element 28. In this case, both the curvilinear deflector 29 secured to the base plate 24 and the continuation 27 of the guide path remain empty.

Figure 8:
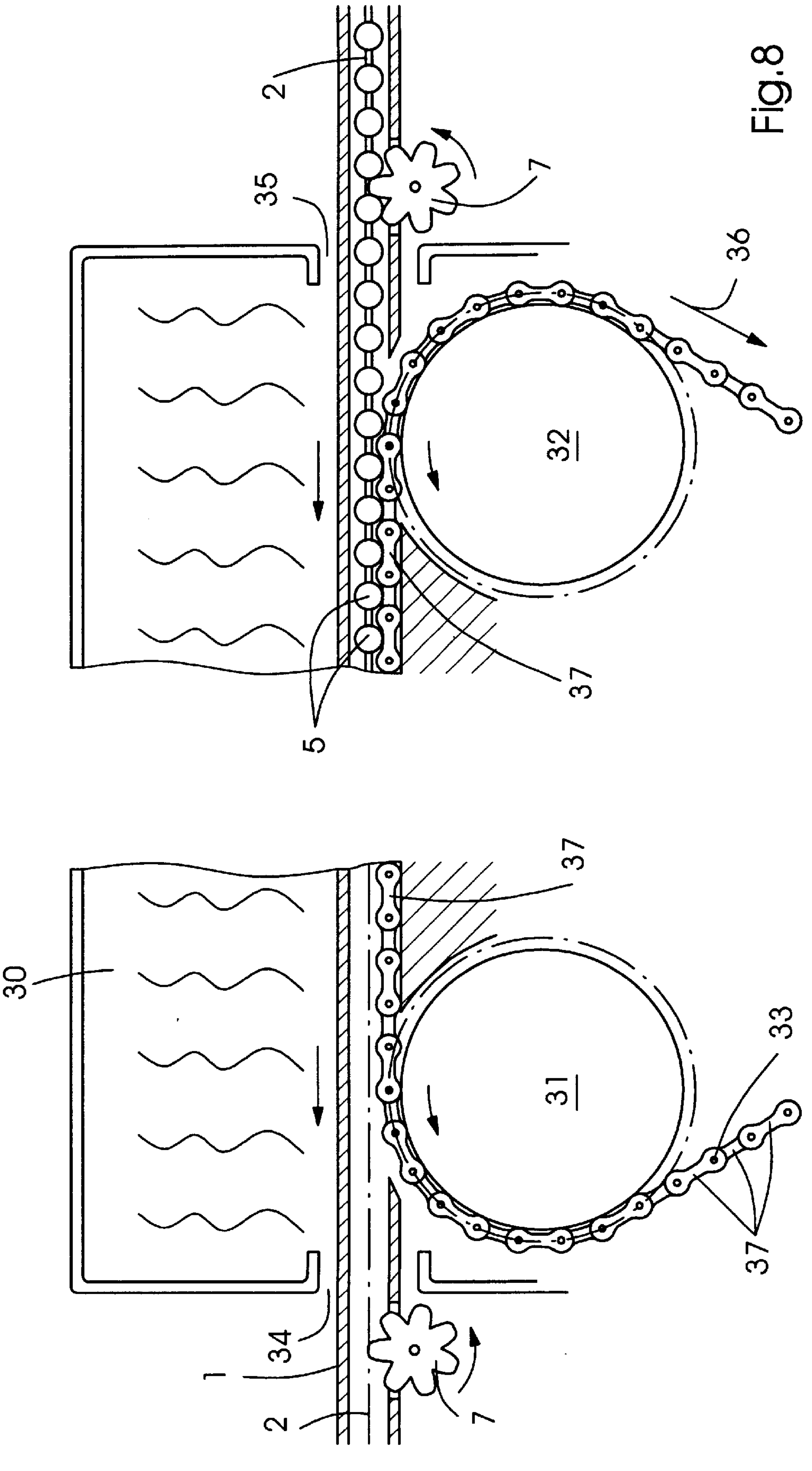
FIG. 8 is a fragmentary, diagrammatic side elevational view of a web infeed or insertion element passing through a dryer region with the aid of a conveyor chain engaging with the underside of the web infeed or insertion element.

FIG. 8 shows an infeed or insertion element 2 which passes through a dryer region with the aid of a conveyor chain which engages with the underside of the web infeed or insertion element 2.

To guide the infeed or insertion element 2 through a dryer 30 which is at a temperature of about 300° C., drive elements 7 of the type described hereinbefore are provided both upstream of the inlet opening 35 of the dryer 30 and downstream of the outlet opening 34 thereof. Below the guide 1, which is open at the bottom thereof in the region of the dryer 30, a revolving conveyor chain 33 is provided, which revolves around sprocket wheels 31 and 32 and is driven thereby in the web conveying direction as indicated by the horizontal arrows. The advancement or feed of the infeed or insertion element 2 and of the conveyor chain 33 is clocked or cycled in such a manner that the individual links 37 of the chain 33 each support one rotationally symmetrical body 5 on the infeed or insertion element 2. The balls 5 shown in FIG. 8 rest upon the individual chain links 37 and are conveyed through the region of the dryer 30 by the advancement or feeding thereof along the chain path 36. The drive elements 7, respectively, disposed upstream and downstream of the dryer 30 take on the task of conveying the infeed or insertion element 2 in the manner previously described in conjunction with FIGS. 1 to 5, in that the surfaces defining the recesses 8 thereof engage with the rotationally symmetrical bodies 5 from above.

By this embodiment, the disposition of temperature-resistant drive mechanisms in the dryer 30, and the insulation thereof can be dispensed with, which contributes to cost reduction. The revolving conveyor chain 33 is a standard part and consequently economical; for the engagement with the infeed or insertion element 2 from below, only the underside of the guide 1 remains open in the region of the guide 1, so that the links 37 of the chain engage with the rotationally symmetrical bodies 5 from below.

Thus, with the embodiment according to the invention, not only extreme path deflections, as can occur, for example, in the angle bar superstructure, but also the passage through the dryer region can be managed automatically, without manual intervention.

Figure 9:
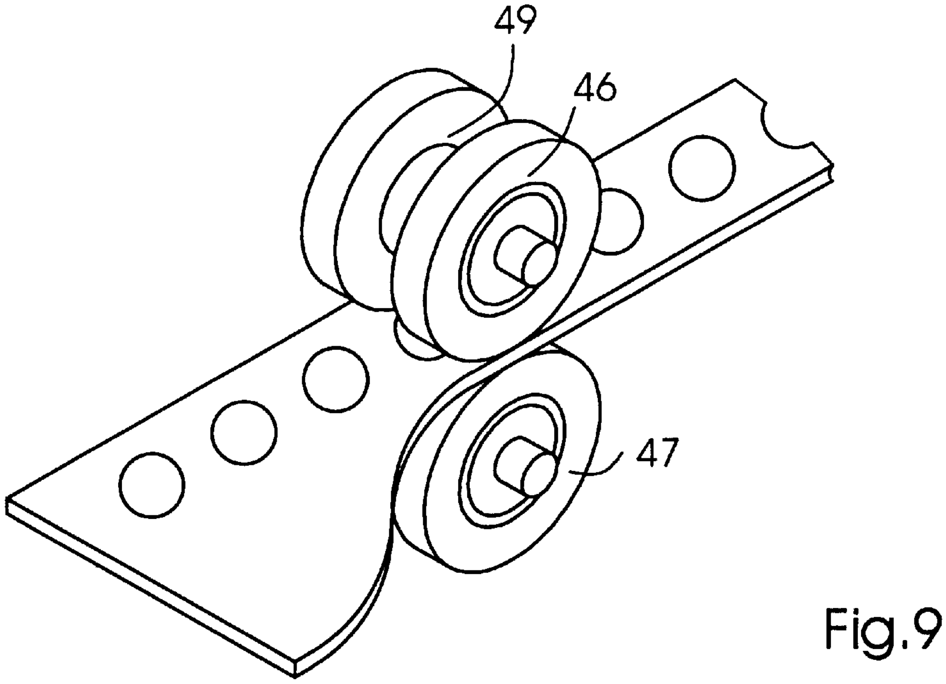
FIGS. 9 and 10 are a diagrammatic perspective view of different embodiments of a drive station for the web infeed or insertion element of the invention.
Figure 10:
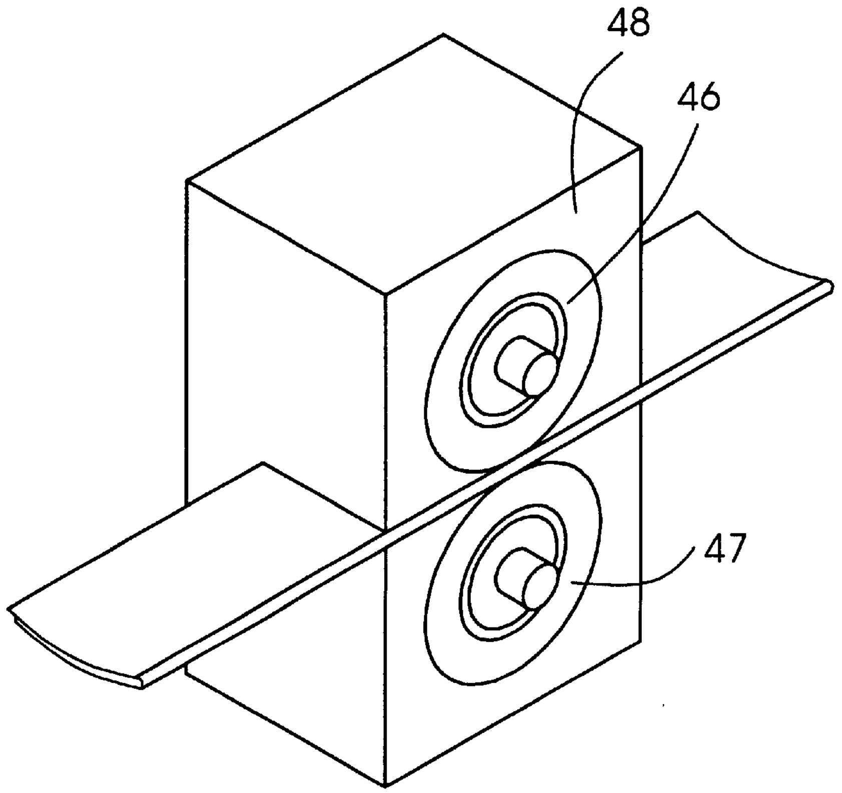

In FIGS. 9 and 10, further embodiments of a drive station for the infeed or insertion element 2 are shown. In these embodiments, the drive element 7 includes two friction rollers 46 and 47 which, as shown in FIG. 10, are disposed inside a box 48, the friction rollers 46 and 47 being driven about the respective axes thereof in a manner analogous to that shown in FIG. 2. The friction rollers 46 and 47 are capable of clamping therebetween the infeed or insertion element 2 provided with rotationally symmetrical bodies 5; the rotation of the friction rollers 46 and 47 brings about the advancement or feed of the infeed or insertion element 2. As further shown in FIG. 10, a recess 49 is provided between each of the friction roller pairs 46, 47, and enables the passage of the rotationally symmetrical bodies 5 between the friction roller pairs 46, 47 during the advancement or feed of the infeed or insertion element 2.

We claim:

1. A web infeed device for rotary printing presses, including a flexible, finite infeed element having a length greater than a spacing between adjacent drive elements for the infeed element, comprising a guide wherein the flexible infeed element is received, a plurality of rotationally symmetrical bodies inserted into the flexible infeed element for guiding the flexible infeed element and for reducing friction thereof within said guide, the flexible infeed element having a coating for reducing friction with said guide.

2. The web infeed device according to claim 1, wherein said rotationally symmetrical bodies are formed as balls.

3. The web infeed device according to claim 1, wherein said rotationally symmetrical bodies are formed as pins.

4. The web infeed device according to claim 1, wherein the flexible infeed element is formed with openings for receiving said rotationally symmetrical bodies therein.

5. The web infeed device according to claim 4, wherein said openings are lined with a friction-reducing material.

6. The web infeed device according to claim 4, wherein defining walls of said openings are coated with Teflon.

7. The web infeed device according to claim 4, wherein sockets formed of Teflon are received in said openings.

8. The web infeed device according to claim 4, wherein cages formed of plastic material are embedded in said openings.

9. The web infeed device according to claim 4, wherein ball cages are embedded in said openings.

10. The web infeed device according to claim 1, wherein said guide is formed with contact surfaces having a friction-reducing coating engageable with said rotationally symmetrical bodies.

11. The web infeed device according to claim 1, wherein the infeed element is of composite construction.

12. The web infeed device according to claim 1, wherein the infeed element is formed of at least one tension-proof layer covered by further layers.

13. The web infeed device according to claim 1, including a chain engageable with the infeed element from below for guiding the infeed element through a drying unit.

14. The web infeed device according to claim 1, including a chain having chain links engageable with said rotationally symmetrical bodies from below for guiding the infeed element in a form-locking manner through a dryer.

15. The web infeed device according to claim 1, including drive elements for the infeed element, said drive elements being formed as cylinders having an outer cylindrical surface formed with a plurality of recesses for engaging said rotationally symmetrical bodies from above.

16. The web infeed device according to claim 1, including drive elements for advancing the infeed element, each of said drive elements including two friction rollers for receiving therebetween the infeed element provided with said rotationally symmetrical bodies, said friction rollers being formed with a recess therebetween for permitting passage of said rotationally symmetrical bodies therethrough as the infeed element is advanced through said friction rollers.

* * * * *